(12) United States Patent
Engquist et al.

(10) Patent No.: US 7,931,856 B2
(45) Date of Patent: *Apr. 26, 2011

(54) METHOD OF MANUFACTURING CRANKSHAFT BUSHING

(75) Inventors: John Engquist, Saint Charles, IL (US); Bret E. Viant, Glendale Heights, IL (US); Mark R. Haas, Geneva, IL (US); Kurt Kujawski, Sandwich, IL (US); Matthew D. Bowman, Saint Charles, IL (US); Kevin J. Skibinski, Geneva, IL (US)

(73) Assignee: Burgess-Norton Mfg. Co., Inc., Geneva, IL (US)

( * ) Notice: Subject to any disclaimer, the term of this patent is extended or adjusted under 35 U.S.C. 154(b) by 903 days.

This patent is subject to a terminal disclaimer.

(21) Appl. No.: 11/897,833

(22) Filed: Sep. 4, 2007

(65) Prior Publication Data

US 2009/0060771 A1    Mar. 5, 2009

(51) Int. Cl.
  *B22F 3/02* (2006.01)
(52) U.S. Cl. .................... 419/66; 419/2; 419/5; 419/11; 419/27; 419/38
(58) Field of Classification Search .................... 419/29, 419/66
See application file for complete search history.

(56) References Cited

U.S. PATENT DOCUMENTS

| | | | | |
|---|---|---|---|---|
| 2,890,487 | A * | 6/1959 | Morin | 425/468 |
| 3,445,148 | A * | 5/1969 | Grad et al. | 384/279 |
| 3,555,621 | A * | 1/1971 | Hara | 425/3 |
| 3,593,366 | A * | 7/1971 | Smith | 425/78 |
| 5,540,883 | A * | 7/1996 | Jones et al. | 419/28 |
| 6,143,240 | A * | 11/2000 | Jones et al. | 419/25 |
| 2004/0086415 | A1* | 5/2004 | Gubanich et al. | 419/38 |
| 2007/0041672 | A1* | 2/2007 | Maruyama et al. | 384/279 |
| 2007/0278891 | A1* | 12/2007 | Engquist et al. | 310/216 |

* cited by examiner

*Primary Examiner* — Roy King
*Assistant Examiner* — Christopher Kessler
(74) *Attorney, Agent, or Firm* — Edward J. Brosius

(57) ABSTRACT

A method of forming a crankshaft bushing or similar component is provided. A compaction die is provided having an axial, generally cylindrical internal opening. An upper and a lower punch are provided with exterior surfaces corresponding to the internal opening of the compaction die. An upper core rod passes through an axial opening in the upper punch. A lower core rod passes through an axial opening in the lower punch. The upper core rod and the lower core rod each may have a generally flat external surface section. A metal powder is compacted in the compaction die by the combined action of the upper and lower punches and the upper and lower core rods.

24 Claims, 2 Drawing Sheets

FIG. 1
FIG. 2
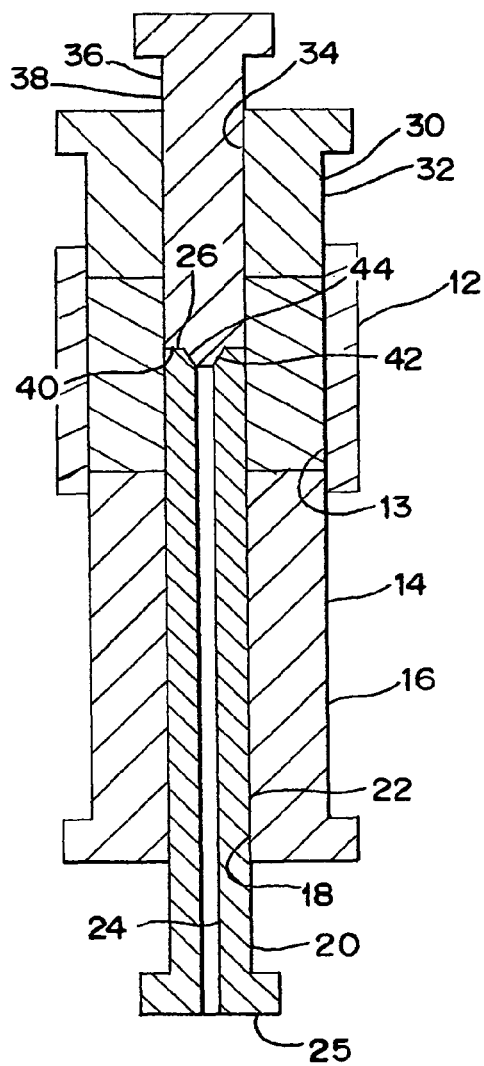
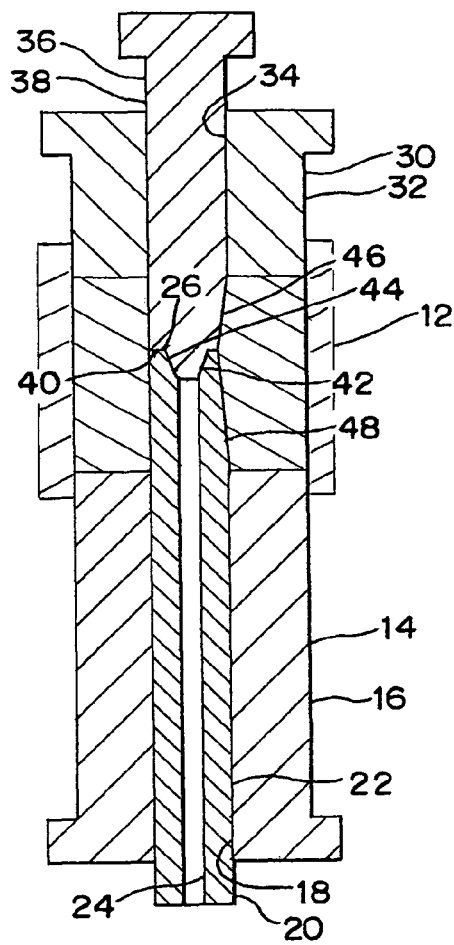

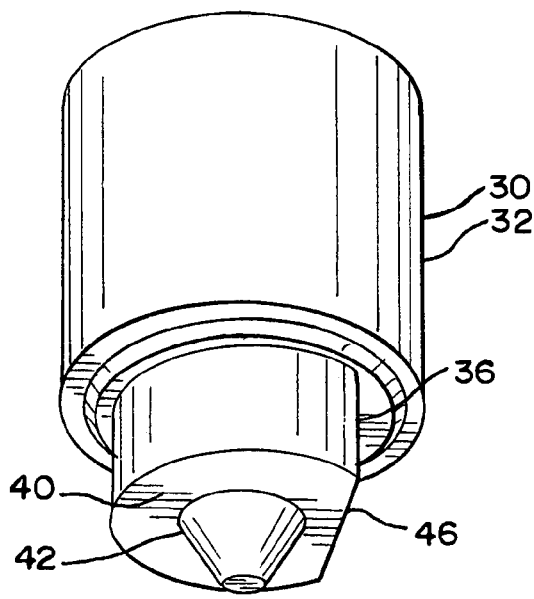
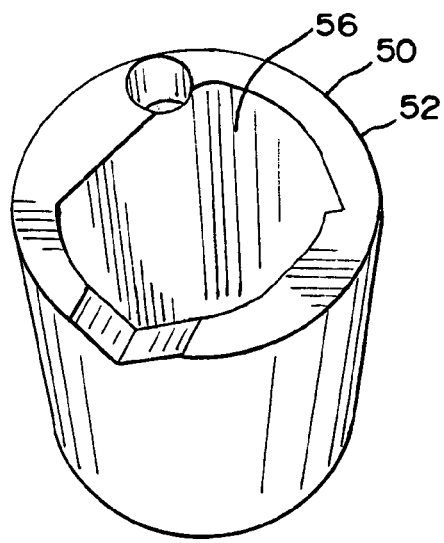
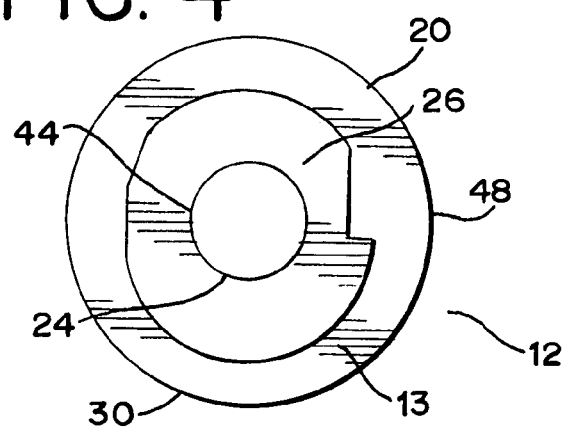
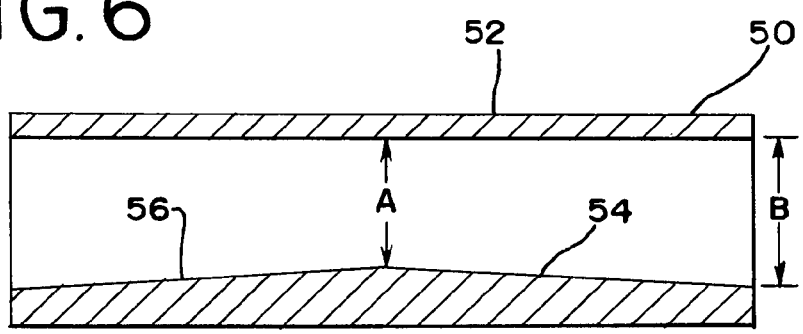

METHOD OF MANUFACTURING CRANKSHAFT BUSHING

BACKGROUND OF THE INVENTION

The present invention relates to a method of forming a crankshaft bushing and, more particularly, a method of forming a crankshaft bushing using a powder metal process with a compaction die combined with punches and core rods.

Ordinary powder metal procedures and methods for forming crankshaft bushings and similar components having a generally cylindrical axial internal opening are useful. However, if a modification is necessary to the internal axial opening within the bushing, such as the forming of a slightly convex surface, such traditional powder metal methods require further finishing. Such further finishing is usually in the form of machining wherein the external cylindrical geometry of the outer diameter is ground such that the slightly convex surface is accurately oriented to the outer geometry. Such additional machining steps are not desirable from a cost point of view and from a productivity point of view.

Accordingly, is an object of the present invention to provide an improved method for forming a crankshaft bushing or similar component utilizing powder metal methods.

It is another object of the present invention to provide a method of forming a crankshaft bushing or similar component using powder metal procedures wherein an internal surface of the bushing includes a generally flat or slightly convex surface.

SUMMARY OF THE INVENTION

A method of forming a crankshaft bushing or similar product using powder metallurgy techniques is provided.

Typically, a compaction die having a generally cylindrical axial internal opening is provided. A lower punch is provided having an exterior surface that corresponds to the internal opening of the compaction die. An upper punch is provided having an exterior surface that also corresponds to the internal opening of the compaction die.

The lower punch itself further has an internal opening that is generally cylindrical and axial. A lower core rod has an exterior surface that corresponds to the internal opening of the lower punch.

The upper punch also has a generally cylindrical axial internal opening. An upper core rod is provided that has an exterior surface that corresponds to the internal opening in the upper punch.

A metal powder is introduced into an internal opening of the compaction die. The metal powder is compacted to form a powder metal blank by having the lower punch and upper punch enter the internal opening of the compaction die. Further the lower core rod passes through the axial opening in the lower punch and the upper core rod passes through the opening in the upper punch to also enter the compaction die in a manner such that a top surface of the lower core rod and a bottom of the upper core rod approach each other. Accordingly, a powder metal blank in the general form of the bushing or similar product is formed.

Further, the lower core rod includes a generally flat or slightly convex section on its exterior surface which section is tapered from the top surface of the lower core rod downwardly to an intersection with an exterior wall section of the lower core rod. Similarly, the upper core rod includes a generally flat or slightly convex section on its exterior surface which section is tapered from the bottom surface of the upper core rod upwardly to an intersection with an exterior wall section of the upper core rod to form the generally flat or slightly convex section on the powder metal blank.

Further, the lower core rod itself includes a generally cylindrical axial internal opening. Upon compaction of the metal powder in the internal opening of the compaction die, excess metal powder can exit the internal opening of the compaction die through the internal opening in the lower core rod.

BRIEF OF THE DESCRIPTION OF THE DRAWINGS

In the drawings, FIG. 1 is a side, cross sectional view of an apparatus for carrying out the method of the present invention;

FIG. 2 is a side, cross sectional view at a 90° angle from the view of FIG. 1 of an apparatus for carrying out the method of the present invention;

FIG. 3 is a perspective view of an upper punch and upper core rod in accordance as part of the apparatus for carrying out the method in accordance with the present invention;

FIG. 4 is a bottom view of a lower punch and lower core rod and compaction die of an apparatus for carrying out the method of the present invention;

FIG. 5 is a perspective view of a bushing made in accordance with the method of the present invention, and FIG. 6 is a side view in cross section of a bushing made in accordance with the method of the present invention.

DETAILED DESCRIPTION OF THE PREFERRED EMBODIMENT

Referring to FIGS. 1 and 2, compaction die 12 is seen to be a generally cylindrical structure having an internal cylindrical surface 13. Compaction die 12 usually comprised of a tool steel and is usually between 5 and 10 inches (12.7 and 25.4 centimeters) in diameter and about 5 to 10 inches in height (12.7 and 25.4 centimeters). Internal opening 13 is obviously tied to the desired shape of the bushing or other product being formed, but such internal diameter is usually 1 to 2 inches with a height of 2 to 4 inches (2.54 to 5.08 to 2.54 to 10.16 centimeters).

Lower punch 14 is again seen to be a generally cylindrical structure with an outer diameter corresponding to internal opening 13 of compaction die 12. Lower punch 14 has a usually cylindrical outer surface 16, with again a usually cylindrical axial internal opening 18. Lower punch 14 again is usually comprised of a tool steel, and is usually about 4 to 6 inches in length (10.16 to 15.24 centimeters).

Lower core rod 20 is seen to comprise a generally cylindrical structure having an outer surface 22 that corresponds to internal opening 18 of lower punch 14. Lower core rod 20 also includes an axial, usually cylindrical internal opening 24 that extends from the top surface 26 of lower core rod 22 to the bottom 25 of lower core rod 20. Again lower core rod 20 is usually comprised of tool steel and is generally 6 to 8 inches in length (15.24 to 20.32 centimeters).

Upper punch 30 is seen to be generally cylindrical structure having an outer generally cylindrical surface 32 and an internal generally cylindrical axial opening 34. Again the dimensions of upper punch 30 would be similar to the dimension of lower punch 14 in that outer surface 32 of outer punch 30 would enter internal opening 13 in compaction die 12 from the top; whereas lower punch 14 enters opening 13 of compaction die 12 from the bottom. Upper punch 30 is also seen to have an internal generally cylindrical axial opening 34 of a similar dimension to the internal opening 18 of lower punch 14. Upper punch 30 is usually comprised of tool steel and usually has a length of 2 to 3 inches (5.08 to 7.62 centimeters).

Upper core rod 36 is seen to be generally cylindrical structure having an outer surface 38 that is generally cylindrical and sized to fit into internal opening 34 of upper punch 30. Upper core rod 36 is also seen to have a bottom surface 40 which is seen to approach and align with top surface 26 of lower core rod 20. Bottom surface 40 of upper core rod 36 is also seen to include a protrusion 42 which is usually of a tapered cylindrical or pyramidal type structure. Such protrusion 42 is seen to align with and enter a corresponding depression 44 in the top surface 26 of lower core rod 20.

Further, lower core rod 20 is seen to have a flattened or slightly concave surface 48 that extends from outer surface 22 of lower core rod 22 to the top surface 26 of lower core rod 20. Similarly, upper core rod 36 is seen to have a flattened surface 46 that extends from the outer surface 38 of upper core rod 36 to the bottom surface 40 of upper core rod 36.

Referring now to FIG. 3, a detailed view of upper punch 30 is shown, with outer surface 32 of upper punch 30 clearly being shown as a cylindrical surface. Further, upper core rod 36 is also shown with bottom surface 40 and protrusion 42. Protrusion 42 is here shown to be a tapered cylindrical surface, but could be a pyramidal tapered surface as well. Upper core rod 36 is also seen to comprise a flat surface or slightly concave 46 extending from bottom 40 of upper core rod 36 upwardly to an intersection with outer surface 38 of upper core rod 36 in a tapering fashion.

Referring now to FIG. 4, bottom of compaction die 12 is shown with compaction die 12 clearly seen to be a generally cylindrical structure. Internal opening 13 in compaction die 12 is also clearly shown. Lower core rod 20 is clearly seen to be a generally cylindrical structure protruding from the internal opening in upper punch 30 top surface of 26 of lower core rod 20 is also clearly shown to have an internal opening 24 therein the top of which is a depression 44. Depression 44 leads to internal opening 24 in lower core rod 20. Finally, lower core rod 20 is seen to have flat surface 48 that approaches and aligns with flat surface 46 and upper core rod 36.

Referring now to FIGS. 5 and 6, a crankshaft bushing made in accordance with the method of the present invention is generally shown at 50. Bushing 50 is seen to have a generally cylindrical outer surface 52, with a first inner flat surface 54 and a second inner flat surface 56. Bushing 50 can be comprised of any of the desired metal powder compositions, which will be described further below in examples. First inner flat surface 54 of bushing 50 would be formed by contact with upper core rod flat surface 46, and bushing second inner flat surface 56 is formed by contact with lower core rod flat surface 48.

The material for bushing 50 can be, as mentioned above, any low alloy material that would produce a strong wear resistant metallic structure.

In general, a method of manufacturing a bushing in accordance with one aspect of the present invention comprises the steps of providing an initial metal alloy powder comprising the desired elemental components, with the balance essentially iron. A suitable lubricant is added in accordance with powder metal practice to form lubricated metal powder. The lubricated metal powder is then injected into the internal opening of compaction die 12. The metal powder is then compacted, typically at a pressure of between 40 and 65 tons per square inch, to form a die compacted metal blank. The compaction is accomplished by having the upper punch 30 and lower punch 14 enter the opening in compaction die 12 under suitable pressures, while the lower core rod 20 and upper core rod 36 both enter the internal opening of compaction die 12 through the respective openings in lower punch 14 and upper punch 30. The partial flatten surfaces on bushing 50 are created by the alignment of lower core rod 20 and upper core rod 36, with top surface 26 of lower core rod 20 and bottom surface 40 of upper core rod 36 approaching and eventually contacting each other with upper core rod protrusion 42 entering depression 44 in lower core rod top surface 26.

Examples of the method of carrying out the present invention follow:

EXAMPLE 1

In a method of manufacturing a crankshaft bushing, a metal powder of particle sizes between 45 and 250 micron was provided comprising, by weight, 0.5% C composition and 0.85% Mo composition, with the balance essentially iron. A 0.75 percent of EBS was added as a lubricant to form a lubricated metal powder. The lubricated metal powder was compacted at a pressure of 45 tons per square inch in a compaction die utilizing a lower punch having a lower core rod and an upper punch having an upper core rod. The resulting die compacted metal blank was then sintered at a temperature of 2080° F. for 15 minutes, the sintered metal blank was then quenched from an initial temperature of 1650° F. to a temperature of 150° F. The quenched metal blank was then tempered at a temperature of 380° F. for 120 minutes. The final tempered metal blank was then finish ground to the final bushing dimensions and configurations.

EXAMPLE 2

In a method of manufacturing a crankshaft bushing, a metal powder of particle sizes between 45 and 250 micron was provided comprising, by weight, 0.5% C composition and 1.5% Mo composition, with the balance essentially iron. A 0.75 percent of EBS was added as a lubricant to form a lubricated metal powder. The lubricated metal powder was compacted at a pressure of 45 tons per square inch in a compaction die utilizing a lower punch having a lower core rod and an upper punch having an upper core rod. The resulting die compacted metal blank was then sintered at a temperature of 2080° F. for 15 minutes, the sintered metal blank was then quenched from an initial temperature of 1650° F. to a temperature of 150° F. The quenched metal blank was then tempered at a temperature of 380° F. for 120 minutes. The final tempered metal blank was then finish ground to the final bushing dimensions and configurations.

The invention claimed is:

1. A method of forming a bushing comprising the steps of:
providing a compaction die having internal walls forming an internal opening, the internal opening having a bottom and a top,
providing a lower punch having exterior walls forming an exterior surface that generally corresponds to the internal opening of the compaction die, the lower punch entering the bottom of the internal opening in the compaction die, the lower punch having interior walls that form an internal opening,
providing an upper punch having exterior walls forming an exterior surface that generally corresponds to the internal opening of the compaction die, the upper punch entering the top of the internal opening in the compaction die, the upper punch having interior walls that form an internal opening, providing a lower core rod having exterior walls forming an exterior surface that generally corresponds to the internal opening in the lower punch, the lower core rod including interior walls forming an interior opening, the lower core rod having a top surface, providing an upper core rod having exterior walls forming an exterior surface that generally corresponds to the internal opening in the upper punch, the upper core rod having a bottom surface, introducing a metal powder into the internal opening of the compaction die, and compacting the metal powder to form a powder metal blank by having the lower punch and the upper punch enter the internal opening in the compaction die, and by having the lower core rod and the upper core rod enter the compaction die in a manner such that the top surface of the lower core rod and the bottom surface of the upper core rod approach each other such that an axial opening is formed in the powder metal blank, wherein the lower core rod includes a generally flat section, on its exterior surface which generally flat section is tapered from the top surface of the lower core rod downwardly to an intersection with an exterior wall section to form the generally flat section.

2. The method of claim 1 wherein the generally flat section of the lower core rod has a slightly concave surface geometry from the top surface to the intersection with the exterior wall section.

3. The method of claim 1 wherein the upper core rod includes a generally flat section on its exterior surface, which generally flat section is tapered from the bottom surface of the upper core rod upwardly to an intersection with an exterior wall section to form the generally flat section.

4. The method of claim 3 wherein the generally flat section of the upper core rod has a slightly concave surface geometry from the bottom surface to the intersection with the exterior wall section.

5. The method of claim 1 wherein the lower core rod has a slightly concave tapered surface on its exterior surface extending from the top surface of the lower core rod downwardly to an intersection with an exterior wall section to form the slightly concave tapered surface of the lower core rod.

6. The method of claim 1 wherein the upper core rod has a slightly concave tapered surface on its exterior surface extending from the bottom surface of the upper core rod upwardly to an intersection with an exterior wall section to form the slightly concave tapered surface of the upper core rod.

7. The method of claim 1 wherein the top surface of the lower core rod includes a depression and the bottom surface of the upper core rod includes a protrusion, and wherein upon compaction, the protrusion on the bottom surface of the upper core rod at least partially enters the depression in the top surface of the lower core rod.

8. The method of claim 7 wherein the depression in the top surface of the lower core rod is formed by tapered walls, and the protrusion on the bottom surface of the upper core rod is formed by complementarily tapered walls.

9. The method of claim 7 wherein, upon compaction, excess metal powder exits the internal opening of the compaction die through the interior opening on the lower core rod.

10. A method for forming a bushing comprising the steps of:

providing a compaction die having internal walls forming an internal opening, the internal opening in the compaction die being generally vertically axial and having a bottom and a top, providing a lower punch having an exterior surface that generally corresponds to the internal opening in the compaction die, the lower punch also having an internal generally vertically axial opening, providing an upper punch having an exterior surface that generally corresponds to the internal opening of the compaction die, the upper punch also having an internal generally vertically axial opening, providing a lower core rod having an exterior surface that generally corresponds to the internal generally vertically axial opening in the lower punch, the lower core rod including a generally vertically axial internal opening, the lower core rod having a top surface, providing an upper core rod having an exterior surface that generally corresponds to the generally vertically axial internal opening in the upper punch, the upper core rod having a bottom surface, introducing a metal powder into the internal opening in the compaction die and compacting the metal powder to form a metal blank by having the lower punch and the upper punch enter the internal opening in the compaction die, and by having the lower core rod enter the internal opening in the compaction die through the internal opening in the lower punch, and by having the upper core rod enter the internal opening in the compaction die through the internal opening in the upper punch, in a manner such that the top surface of the lower core rod and the bottom surface of the upper core rod approach each other, wherein the lower core rod includes a generally flat section on its exterior surface which is tapered from the top surface of the lower core rod downwardly to an intersection with the exterior surface of the lower core rod to form the generally flat section.

11. The method of claim 10 wherein, upon compaction, the lower punch enters the internal opening of the compaction die through the bottom of the internal opening in the compaction die, and the upper punch enters the internal opening of the compaction die through the top of the internal opening in the compaction die.

12. The method of claim 10 wherein the upper core rod includes a generally flat section on its exterior surface which is tapered from the bottom surface of the upper core rod upwardly to an intersection with the exterior surface of the upper core rod to form the generally flat section.

13. The method of claim 10 wherein the top surface of the lower core rod includes a depression and the bottom surface of the upper core rod includes a protrusion, and wherein, upon compaction, the protrusion on the bottom surface of the upper core rod at least partially enters the depression in the top surface of the lower core rod.

14. The method of claim 13
wherein the depression in the top surface of the lower core rod is formed by tapered walls,
and the protrusion on the bottom surface of the upper core rod is formed by complementarily tapered walls.

15. The method of claim 10
wherein, upon compaction, excess metal powder exits the internal opening of the compaction die through the internal opening in the lower core rod.

16. A method of manufacturing a bushing comprising the steps of:
providing a compaction die having internal walls forming a generally cylindrical vertically axial internal opening, the internal opening having a bottom and a top,
providing a lower punch having a generally cylindrical exterior surface that corresponds to the internal opening in the compaction die, the lower punch also having a generally cylindrical vertically axial internal opening,
providing an upper punch having a generally cylindrical exterior surface that corresponds to the internal opening in the compaction die, the upper punch also having a generally cylindrical vertically axial internal opening,
providing a lower core rod having a generally cylindrical exterior surface that corresponds to the internal opening in the lower punch, the lower core rod also having a generally cylindrical vertically axial internal opening, the lower core rod also having a top surface,
providing an upper core rod having a generally cylindrical exterior surface that corresponds to the internal opening in the upper punch, the upper core rod also having a bottom surface,
introducing a metal powder into the internal opening of the compaction die and compacting the metal powder to form a metal blank by having the lower punch enter the bottom of the internal opening of the compaction die and the upper punch enter the top internal opening of the compaction die,
and by having the lower core rod enter the internal opening in the compaction die through the internal opening in the lower punch,
and by having the upper core rod enter the internal opening in the compaction die through the internal opening in the upper punch,
in a manner such that the surface of the lower core rod and the bottom surface of the upper core rod approach each other, wherein the lower core rod includes a generally flat section on its exterior surface which is tapered from the top surface of the lower core rod downwardly to an intersection with the exterior surface of the lower core rod to form the generally flat section.

17. The method of claim 16
wherein the upper core rod includes a generally flat section on its exterior surface which is tapered from the bottom surface of the upper core rod upwardly to an intersection with the exterior surface of the upper core rod to form the generally flat section.

18. The method of claim 16
wherein the top surface of the lower core rod includes a depression and the bottom surface of the upper core rod includes a depression,
and wherein, upon compaction, the protrusion on the bottom surface of the upper core rod at least partially enters the depression in the top surface of the lower core rod.

19. The method of claim 18
wherein the depression in the top surface of the lower core rod is formed by tapered walls,
and the protrusion on the bottom surface of the upper core rod is formed by complementarily tapered walls.

20. The method of claim 16
wherein, upon compaction, excess metal powder exits the internal opening of the compaction die through the internal opening in the lower core rod.

21. A method of forming a bushing comprising the steps of:
providing a compaction die having internal walls forming an internal opening, the internal opening having a bottom and a top,
providing a lower punch having exterior walls forming an exterior surface that generally corresponds to the internal opening of the compaction die, the lower punch entering the bottom of the internal opening in the compaction die, the lower punch having interior walls that form an internal opening,
providing an upper punch having exterior walls forming an exterior surface that generally corresponds to the internal opening of the compaction die, the upper punch entering the top of the internal opening in the compaction die, the upper punch having interior walls that form an internal opening,
providing a lower core rod having exterior walls forming an exterior surface that generally corresponds to the internal opening in the lower punch, the lower core rod including interior walls forming an interior opening, the lower core rod having a top surface,
providing an upper core rod having exterior walls forming an exterior surface that generally corresponds to the internal opening in the upper punch, the upper core rod having a bottom surface,
introducing a metal powder into the internal opening of the compaction die, and compacting the metal powder to form a powder metal blank by having the lower punch and the upper punch enter the internal opening in the compaction die,
and by having the lower core rod and the upper core rod enter the compaction die in a manner such that the top surface of the lower core rod and the bottom surface of the upper core rod approach each other such that an axial opening is formed in the powder metal blank,
wherein the upper core rod includes a generally flat section on its exterior surface, which generally flat section is tapered from the bottom surface of the upper core rod upwardly to an intersection with an exterior wall section to form the generally flat section.

22. The method of claim 21
wherein the generally flat section of the upper core rod has a slightly concave surface geometry from the bottom surface to the intersection with the exterior wall section.

23. A method for forming a bushing comprising the steps of:
providing a compaction die having internal walls forming an internal opening, the internal opening in the compaction die being generally vertically axial and having a bottom and a top,
providing a lower punch having an exterior surface that generally corresponds to the internal opening in the compaction die, the lower punch also having an internal generally vertically axial opening,
providing an upper punch having an exterior surface that generally corresponds to the internal opening of the compaction die, the upper punch also having an internal generally vertically axial opening,
providing a lower core rod having an exterior surface that generally corresponds to the internal generally vertically axial opening in the lower punch, the lower core rod including a generally vertically axial internal opening, the lower core rod having a top surface, providing an upper core rod having an exterior surface that generally corresponds to the generally vertically axial internal opening in the upper punch, the upper core rod having a bottom surface, introducing a metal powder into the internal opening in the compaction die and compacting the metal powder to form a metal blank by having the lower punch and the upper punch enter the internal opening in the compaction die, and by having the lower core rod enter the internal opening in the compaction die through the internal opening in the lower punch, and by having the upper core rod enter the internal opening in the compaction die through the internal opening in the upper punch, in a manner such that the top surface of the lower core rod and the bottom surface of the upper core rod approach each other, wherein the upper core rod includes a generally flat section on its exterior surface which is tapered from the bottom surface of the upper core rod upwardly to an intersection with the exterior surface of the upper core rod to form the generally flat section.

24. A method of manufacturing a bushing comprising the steps of:

providing a compaction die having internal walls forming a generally cylindrical vertically axial internal opening, the internal opening having a bottom and a top, providing a lower punch having a generally cylindrical exterior surface that corresponds to the internal opening in the compaction die, the lower punch also having a generally cylindrical vertically axial internal opening, providing an upper punch having a generally cylindrical exterior surface that corresponds to the internal opening in the compaction die, the upper punch also having a generally cylindrical vertically axial internal opening, providing a lower core rod having a generally cylindrical exterior surface that corresponds to the internal opening in the lower punch, the lower core rod also having a generally cylindrical vertically axial internal opening, the lower core rod also having a top surface, providing an upper core rod having a generally cylindrical exterior surface that corresponds to the internal opening in the upper punch, the upper core rod also having a bottom surface, introducing a metal powder into the internal opening of the compaction die and compacting the metal powder to form a metal blank by having the lower punch enter the bottom of the internal opening of the compaction die and the upper punch enter the top internal opening of the compaction die, and by having the lower core rod enter the internal opening in the compaction die through the internal opening in the lower punch, and by having the upper core rod enter the internal opening in the compaction die through the internal opening in the upper punch, in a manner such that the surface of the lower core rod and the bottom surface of the upper core rod approach each other, wherein the upper core rod includes a generally flat section on its exterior surface which is tapered from the bottom surface of the upper core rod upwardly to an intersection with the exterior surface of the upper core rod to form the generally flat section.

\* \* \* \* \*